Oct. 8, 1940.　　　　K. ZWICK　　　　2,217,091

FEEDING DEVICE FOR MACHINE TOOLS

Filed May 25, 1939

*Inventor*
Kurt Zwick
By Cumpston & Shepard
*his* Attorneys.

Patented Oct. 8, 1940

2,217,091

UNITED STATES PATENT OFFICE 2,217,091

FEEDING DEVICE FOR MACHINE TOOLS

Kurt Zwick, Munich, Germany, assignor to Friedrich Deckel, Munich - Prinz Ludwigshohe, Bavaria, Germany Application May 25, 1939, Serial No. 275,703
In Germany June 1, 1938

12 Claims. (Cl. 51—219)

This invention deals with a feeding device for machine tools, and more particularly a device for feeding work relatively to a grinding or cutting tool, in such manner as to impart to the work a rotary motion as well as a rectilinear feeding motion.

An object of the invention is the provision of a generally improved and more satisfactory device of the above kind.

Another object is the provision of a device in which the ratio of rotary motion to rectilinear motion of the work may be accurately controlled with ease.

A further object is the provision of such a device in which the ratio of rectilinear motion to rotary motion is controlled by means of a cam of a form which can be made comparatively easily and inexpensively.

A still further object is the provision of such a device in which the control cam is so designed and constructed that different parts of the same cam may be used for obtaining various different ratios of rotary motion to rectilinear motion, thus reducing the number of different cams required for performing different operations and minimizing the expense.

To these and other ends the invention resides in certain improvements and combinations of parts, all as will be hereinafter more fully described, the novel features being pointed out in the claims at the end of the specification.

In the drawing.

The same reference numerals throughout the several views indicate the same parts.

Figure 1:
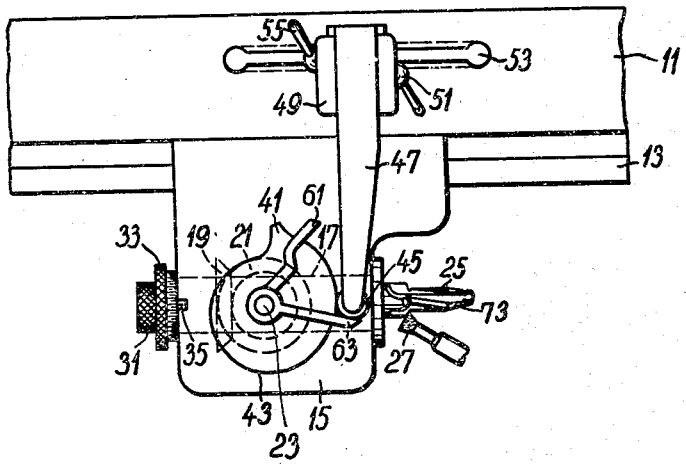
Fig. 1 is a plan of a device constructed in accordance with a preferred embodiment of the invention.

In the machine here illustrated as a preferred example of the invention, there is provided a machine stand or frame 11 having a trackway 13, conveniently of dovetail form or other suitable shape, along which slides a carriage 15. This carriage is partially hollow, and in the hollow part of it is mounted a rotatable shaft 17 to which is secured a bevel gear 19 meshing with another bevel gear 21 secured to a shaft 23 arranged approximately at right angles to the shaft 17, and preferably extending vertically when the shaft 17 lies approximately horizontally, as is usually the case.

The shaft 17 is provided at its right hand end with a chuck (not shown in detail) of any conventional construction in which the drill, cutter, or other work piece to be operated upon may be held, as indicated at 25, to cooperate with any suitable cutting or grinding tool, such as the grinding wheel 27 driven from an electric motor or other source of power. A knob 31 at the left hand end of the shaft 17 may be turned relatively to the shaft to clamp the chuck upon the work 25 or to unclamp it therefrom, in known manner, the details of the chuck and the manner of clamping and unclamping it being immaterial so far as the present invention is concerned. A second knob 33 is fixed to the shaft 17 to turn therewith, and constitutes the operating member to be grasped to turn the shaft to any desired position, when indexing or when feeding the work. Graduations accompanying the knob 33 may cooperate with an index mark 35 on the housing 15.

For grinding various kinds of work pieces 25, such as certain types of cutters or drills, the rectilinear feeding motion of the work relatively to the tool 27 should be in a direction parallel to the axis of the cutter or drill which constitutes the work piece, and hence the axis of the shaft 17 (which coincides with the axis of the work piece of this kind) should be parallel to the direction of the guideway or trackway 13 on which the housing 15 moves. Such a parallel arrangement is illustrated in Fig. 1, for the sake of example. For grinding certain other kinds of work pieces, such as certain types of conical cutters or drills, the rectilinear feeding motion of the work 25 relatively to the tool 27 should be in a direction at an angle to, and intersecting, the axis of the work. In such a case, the shaft 17 should not be parallel to the guideway 13, but should be at the appropriate angle thereto. If it is desired to make the machine capable of operating on both classes of work, the shaft 17 may be so mounted that it may be swung to various angular relations to the guideway 13. It is believed unnecessary to disclose in the present application any means for thus adjustably mounting the shaft 17, since the principles of the present invention apply regardless of whether the axis of the shaft 17 is in fixed parallel relation to the guideway 13 or whether it is adjustable to an angular position relative to the guideway. It may be mentioned, however, that when such adjustability is desired, it may be attained in the manner disclosed in one or the other of my copending United States Patent applications, Serial No. 223,269, filed August 5, 1938, for Work turning device for machine tools (see Fig. 4), or Serial No. 262,410, filed March 17, 1939, for Grinding machine (in which the axis of the work piece 111 is adjustable to various angles with respect to the direction of movement of the slide 27).

Figure 2:
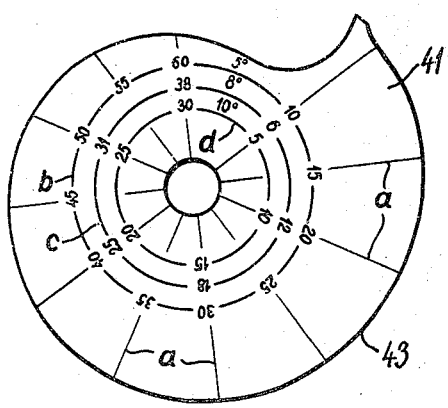
Fig. 2 is a plan on a larger scale of the control cam shown in Fig. 1.

The upper end of the vertical shaft 23 projects upwardly through the top of the housing 15 and is provided, above the housing, with a removable cam member 41, best shown in Fig. 2, having a periphery 43 arranged to contact with a stationary stop, or one which has the effect of a stationary stop, such as a small roller 45 mounted on an arm 47 adjustable lengthwise of the arm in a holder 49 and clamped in any adjusted position in this holder by a clamp 51. The holder in turn is adjustable in a direction parallel to the trackway 13 along a slot 53 in the machine frame 11, and is clamped at any desired position along this slot by a clamping device 55.

Now if the periphery of the cam 41 is brought against the stop member 45 and if pressure is applied (by hand or otherwise) to the carriage 15 to maintain the cam tightly against the stop member, it is seen that rotation of the shaft 17 by means of the knob 33 will turn the work 25, giving it a rotary feeding motion, and at the same time will turn the cam 41, which will cause or permit a movement of the carriage 15 along the guideway 13, thus giving the work 25 also a rectilinear feeding motion relative to the tool 27.

The ratio of rectilinear feeding motion to rotary feeding motion will depend on the shape of that part of the periphery of the cam which engages the stop member 45. Due to the fact that the cam is arranged in a plane parallel to the direction of motion of the carriage 15 on its guideway 13, the cam may be of the plane disk type, thus being relatively easy and inexpensive to construct, in comparison to cams of more complicated types, such as cup-shaped cams, box cams, etc. Hence it is a comparatively inexpensive matter to provide any new cam which may be necessary to produce any desired ratio of turning motion to rectilinear motion, for any desired piece of work. But it is not always necessary to provide a different cam for each different feeding ratio. Preferably each cam is laid out, as shown in Fig. 2, in such a way as to provide, on different parts of its periphery, a considerable range of different ratios of turning motion to rectilinear motion, and the respective parts of the cam which will provide these different ratios are preferably shown by graduations marked, for example, in terms of different lead or pitch angles and different diameters of surfaces to be ground.

For instance, the top surface of the cam may be marked with a series of radial divisions $a$ (Fig. 2) and with a series of concentric circles $b$, $c$, and $d$. The circles themselves may be provided with numbers indicating different degrees of pitch or lead angles, while the radial lines may be provided with numbers indicating different diameters, for those particular angles. The shape of the periphery 43 of the cam is such that the theoretical ratios indicated by the graduations are obtained accurately only when the stop member 45 is in contact with the cam periphery at or very close to the proper radial graduation $a$ which corresponds to the desired ratio. As the cam turns so that the stop member 45 moves along the periphery 43 farther away from the proper graduation $a$, a progressively different pitch angle or lead angle is provided on the work, but in practical operation this is not detrimental, for all surfaces on the work-piece which are intended to correspond to each other are ground by starting at the same point on the cam surface 43.

To enable the accurate starting of grinding operations at the desired point on the cam, a limit arm 61 is adjustably clamped on the upper end of the shaft 23 immediately above the cam 41, so that it may be swung around to different positions relatively to the cam and clamped in any desired position. The outer portion of this arm is laterally offset with respect to the inner portion thereof, as shown in Fig. 1, by an amount equal to half the diameter of the roller 45. The inner portion of the arm, which has one edge truly radial with respect to the shaft 23, is set to extend along the radial graduation of the cam 41 which corresponds to the desired beginning point of the grinding operation, and the arm is clamped in this position. Then the arm and the cam together are swung around until the arm contacts with the roller 45, at which time the roller will be in contact with the periphery of the cam exactly at the end of the desired radial graduation, due to the laterally offset nature of the outer end of the arm 61. The grinding operation of each of the corresponding or duplicate cutting edges of the work-piece 25 is then begun in this same relative position of the cam and the roller, as determined by the setting of the arm 61, so that all of such corresponding cutting edges are ground exactly the same. A second limit arm 63 may conveniently be employed, adjustably clamped on the upper end of the shaft 23 above the arm 61, to contact with the roller 45 to determine the point at which each grinding operation stops.

Figure 3:
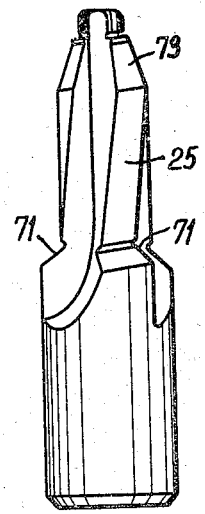
Fig. 3 is a view on a larger scale of a step drill which may be operated upon by the device of the present invention.

Merely for the sake of an illustrative example, the work piece 25 is illustrated in Fig. 3 as being in the form of a stepped drill, having certain cutting edges 71 of one diameter, and other cutting edges 73 of a different diameter. When the edges 71 are to be ground, the limit arm 61 is set in line with that radial graduation $a$ of the cam 41 which corresponds to the diameter of these edges 71 and the desired pitch or lead angle thereof, and the other limit arm 63 is set at an appropriate distance from the arm 61, to prevent accidental turning of shaft 17 too far, which might cause grinding into the next surface.

The arm 61 is then brought against the roller 45, and the work piece 25 is so positioned in the chuck that the surface 71 to be ground is in proper relation to the tool 27. The shaft 17 is then turned by means of the knob 33, while maintaining pressure on the carriage 15 in a direction to press the cam against the roller 45. As the shaft 17 turns, the surface 71 on the work piece is carried past the tool 27 in cooperative relation thereto to perform the grinding operation, and at the same time the cam 41 turns, with the result that the carriage 15 moves longitudinally along the track 13, producing the desired rectilinear feeding of the work relatively to the tool. This produces the desired pitch angle or lead angle of the surface being ground. The limit arm 63 stops the turning at a point before the tool grinds into the next succeeding edge 71.

Then the parts are reset to initial position, bringing the arm 61 once more back against the roller 45, but without shifting the position of this arm relatively to the cam. The work piece 25 is suitably indexed for the grinding of the next succeeding surface 71, either by unclamping it from the chuck and clamping it in again, or in any other desired manner, and the grinding operation is repeated with respect to this next surface 71. The same procedure is followed again as to all the other corresponding surfaces 71 of this drill. Since grinding of all of these surfaces begins with the limit arm 61 against the roller 45, the grinding begins in each case with the stop member 45 in contact with an identical point of the periphery 43 of the cam, and thus the pitch angle of each of the surfaces 71 is identically the same.

When all of these surfaces have been ground and when it is desired to grind the other surfaces 73 having a different diameter, it is in most cases not necessary to remove the cam 41 and replace it with a different cam, but it is necessary merely to make a new setting of the arms 61 and 63 relatively to the cam, placing the arm 61 in line with the division a corresponding to the diameter and desired pitch angle of the surface 73. Then the grinding operation on all of the surfaces 73 is carried out in the same manner above described for the surfaces 71. If there is too great a variation between the diameter or the pitch angle of one group of surfaces and those of another group of surfaces, then the cam 41 may be removed from the shaft 23 and replaced with a different cam which will care for a different range of diameters and pitch angles, although one cam will usually cover a sufficient range of diameters and pitch angles so that the changing of cams is seldom necessary.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A device for forming oblique surfaces on rotary work pieces, including a carriage, means on said carriage for rotatably holding the work piece to be operated upon, a tool for operating upon said work piece while so held by said carriage, said carriage and tool being mounted for rectilinear movement relatively to each other in the general direction of the rotary axis of said work piece, and a cam carried by and movable bodily with said carriage and having an effective edge lying approximately in a plane parallel to the direction of said rectilinear movement and turning with said work piece, for controlling said rectilinear movement.

2. A device for forming oblique surfaces on rotary work pieces, including a carriage, means on said carriage for rotatably holding the work piece to be operated upon, a tool for operating upon said work piece while so held by said carriage, said carriage and tool being mounted for rectilinear movement relatively to each other in the general direction of the rotary axis of said work piece, and a cam of substantially flat disk form carried by and movable bodily with said carriage and having an effective edge lying approximately in a plane parallel to the direction of said rectilinear movement for controlling the movements of said work piece relatively to said tool in an axial direction, said cam being geared to said work piece to turn therewith.

3. A device as described in claim 2, in which said cam has different portions of said effective edge formed with different pitch characteristics, and in which said cam rotates through only a minor fraction of a single revolution during one complete feeding motion of said carriage in one direction, so that different feeding characteristics may be obtained by employing different portions of said edge of the same cam.

4. A feeding device for machine tools including a frame, a tool, a work carriage mounted for rectilinear movement on said frame, means including a rotatable shaft on said carriage for rotatably holding a work piece in position to cooperate with said tool and to be moved relatively to said tool as said carriage is moved relatively to said frame, a second shaft mounted on said carriage and extending approximately perpendicular to said first mentioned shaft, gearing connecting said two shafts to each other to turn said second shaft when said first mentioned shaft is turned, a cam of substantially flat disk form mounted on said second shaft and movable bodily with said carriage and having an effective edge lying substantially in a plane parallel to the direction of said rectilinear movement, and a stop member mounted on said frame for cooperating with said effective edge of said cam to control said rectilinear movement of said carriage in accordance with the shape of said effective edge of said cam.

5. A device as described in claim 4, in which said cam has different portions of said effective edge formed with different effective shapes, and in which said cam rotates through only a minor part of a single revolution during the longitudinal travel of said carriage in one direction through a full cycle, so that by setting said cam with different portions of its effective edge in position to cooperate with said stop member during such movement through a full cycle, different ratios of rectilinear movement to rotary movement of the work can be obtained.

6. A feeding device for machine tools including a frame, a tool, a work carriage mounted for rectilinear movement on said frame, means on said carriage for rotatably holding a work piece in position to cooperate with said tool and to be moved relatively to said tool as said carriage is moved relatively to said frame, a cam mounted on said carriage and having an effective edge lying substantially in a plane parallel to the direction of said rectilinear movement, said cam being operatively connected to said work holding means to turn with the work, a stop member mounted on said frame for cooperating with said effective edge of said cam to control said rectilinear movement of said carriage in accordance with the shape of said edge of said cam, and an adjustable limit member associated with said cam and settable to limit turning of said cam in one direction.

7. A feeding device for machine tools including a frame, a tool, a work carriage mounted for rectilinear movement on said frame, means on said carriage for rotatably holding a work piece in position to cooperate with said tool and to be moved relatively to said tool as said carriage is moved relatively to said frame, a cam mounted on said carriage and having an effective edge lying substantially in a plane parallel to the direction of said rectilinear movement, said cam being operatively connected to said work holding means to turn with the work, a stop member mounted on said frame for cooperating with said effective edge of said cam to control said rectilinear movement of said carriage in accordance with the shape of said edge of said cam, and a pair of adjustable limit members associated with said cam for defining between them a predetermined portion of said edge of said cam selected for cooperation with said stop member during a given feeding operation.

8. A device as described in claim 7, in which each of said adjustable limit members is in the form of an arm extending approximately radially with respect to said cam and settable in various angular positions with respect to said cam.

9. A feeding device for machine tools including a frame, a tool, a work carriage mounted for rectilinear movement on said frame, means on said carriage for rotatably holding a work piece in position to cooperate with said tool and to be moved relatively to said tool as said carriage is moved relatively to said frame, a cam mounted on said carriage and having an effective edge lying substantially in a plane parallel to the direction of said rectilinear movement, said cam being operatively connected to said work holding means to turn with the work, a stop member mounted on said frame for cooperating with said effective edge of said cam to control said rectilinear movement of said carriage in accordance with the shape of said edge of said cam, said cam having different portions of said effective edge formed with different pitch characteristics, and a series of markings on said cam for indicating the characteristics of different portions of said edge.

10. A feeding device for machine tools including a frame, a tool, a work carriage mounted for rectilinear movement on said frame, means on said carriage for rotatably holding a work piece in position to cooperate with said tool and to be moved relatively to said tool as said carriage is moved relatively to said frame, a cam mounted on said carriage and having an effective edge lying substantially in a plane parallel to the direction of said rectilinear movement, said cam being operatively connected to said work holding means to turn with the work, a stop member mounted on said frame for cooperating with said effective edge of said cam to control said rectilinear movement of said carriage in accordance with the shape of said edge of said cam, said cam having different portions of said effective edge formed with different pitch characteristics, a series of markings on said cam for indicating the characteristics of different portions of said edge, and adjustable limit members associated with said cam for defining a predetermined portion of the effective edge of said cam which may cooperate with said stop member during a given feeding operation, at least one of said limit members being in the form of an approximately radial arm cooperating with said markings on said cam.

11. A device for forming oblique surfaces on rotary work pieces, said device including a frame, a tool, a carriage mounted for rectilinear movement on said frame with respect to said tool, means on said carriage for rotatably holding a work piece in position to contact with and be operated upon by said tool as said carriage moves on said frame, a stop member mounted on said frame, a shaft mounted on said carriage and geared to said work piece holding means to rotate therewith, said shaft having a projecting end, and a cam of substantially flat disk form removably mounted on said projecting end of said shaft and having an effective peripheral edge abutting against said stop member to control the movement of said carriage on said frame, said cam being removable from said end of said shaft and replaceable thereon in a reversed position so that a single cam will serve for the production of both right-hand and left-hand oblique surfaces.

12. A device for forming oblique surfaces on rotary work pieces, said device including a frame, a tool, a carriage mounted for rectilinear movement on said frame with respect to said tool, means including a shaft on said carriage for rotatably holding a work piece in position to contact with and be operated upon by said tool as said carriage moves on said frame, a stop member mounted on said frame, a second shaft mounted on said carriage in approximately perpendicular relation to the first mentioned shaft, gearing directly connecting said two shafts to each other to turn one from the other, and a cam of substantially flat disk form mounted on said second shaft and having an effective peripheral edge abutting against said stop member to control the movement of said carriage on said frame with relation to the turning of said work piece.

KURT ZWICK.